Sept. 8, 1931.  E. J. GALLAGHER, JR  1,822,774
WINDSHIELD HEATER
Filed April 5, 1930
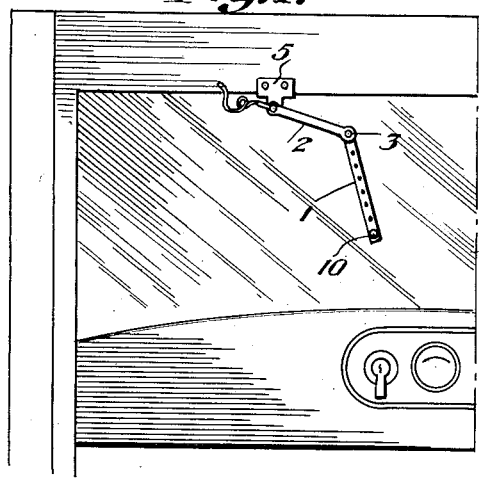
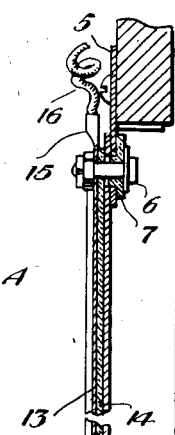
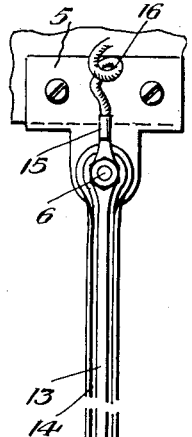
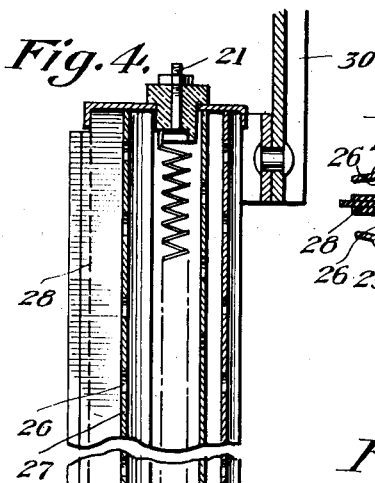
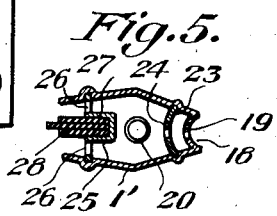
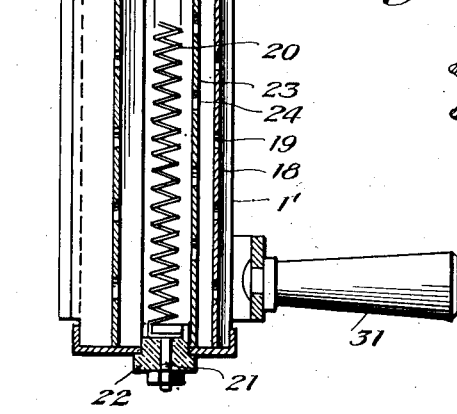
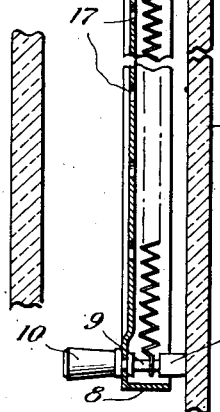
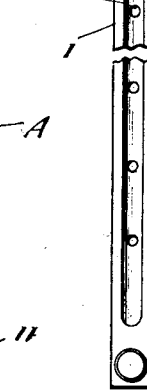
*Edward J. Gallagher, Jr.*
INVENTOR
BY *Victor J. Evans*
ATTORNEY Patented Sept. 8, 1931

1,822,774

UNITED STATES PATENT OFFICE

EDWARD J. GALLAGHER, JR., OF BALTIMORE, MARYLAND

WINDSHIELD HEATER

Application filed April 5, 1930. Serial No. 441,951.

This invention relates to a windshield heater, the general object of the invention being to provide a housing having an electric coil therein, with one edge of the housing open and its other edge having perforations therein so that air can pass through the housing and be heated by the element, with means for supporting the housing adjacent a windshield or other member so that said windshield will be heated by the air passing from the housing and thus snow and ice will be prevented from accumulating thereon.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a fragmentary view of a windshield, showing the invention in use.

Figure 2 is a longitudinal sectional view through the device and part of the windshield.

Figure 3 is a rear view of the device.

Figure 4 is a longitudinal sectional view showing a modification.

Figure 5 is a transverse sectional view through Figure 4.

Figure 6 is a transverse sectional view through a modified form of device and through a part of a transparent member.

Referring to Figures 1, 2 and 3, the numeral 1 indicates a housing made in the form of a channel shaped member with its open side directed toward the transparent member A of a windshield or the like. An arm 2 has one end pivotally connected to an end of the member 1 by a pin 3, the pin being insulated from the members 1 and 2, as shown at 4, and the other end of the member 2 is pivotally connected to a bracket 5 attached to a part of the windshield frame, by a pin 6. This pin is also insulated from the member 2, as shown at 7. The free end of the member 1 is closed, as shown at 8, and this end carries a pin 9 which has a handle 10 of non-conducting material attached to its outer end and a pad 11 connected to its inner end, this pad being adapted to engage the transparent member A so as to hold the member 1 slightly spaced from said transparent member.

A coil 12 has one end connected to the pin 9 and its other end to the pin 3 and a conductor strip 13 is carried by the arm 2 and is insulated therefrom by the strip 14 of insulating material, this conductor strip 13 being connected with the pins 3 and 6. A clip 15 is connected with the strip 13 and receives a conductor 16 which leads to the battery or other source of supply. Thus when the switch which controls the flow of current to the conductor 16 is turned on, current will flow from the conductor through the strip 13, the pin 3 into the coil 12 and will pass through the pin 9, the members 1 and 2 to the bracket, which is grounded. Thus the coil will be heated and the heat from the coil will cause a circulation of air through the perforations 17 in the rear face of the member 1 and through the member and this air will strike the transparent member A and melt any ice or snow thereon.

This form of the device is mainly designed for use on the inside face of a windshield.

In the modification shown in Figures 4 and 5, the housing 1' preferably slopes from its center toward its front and rear edges, and has its rear edge open and its front edge of concaved shape, as shown at 18. Perforations 19 are formed in this concaved part so that air will enter the housing through the perforations as the vehicle travels along. The air, as it passes through the housing, is heated by the electric coil 20 which is connected with the terminals 21 at the ends of the housing and which are insulated from the housing, as at 22. The upper terminal is connected in any suitable manner with a source of supply and the lower end of the coil is grounded on a part of the housing. A curved plate 23 is arranged in the front part of the housing and is spaced from the concaved part 18 and has perforations 24 therein for the passage of the air. A member 25 extends across the housing adjacent the open rear edge thereof, this member having the two rows of perforations 26 therein for the passage of the air from the housing and said member is formed with the channeled central part 27 to receive a partition member 28 which contacts the transparent member of the windshield and acts to divide the streams of air passing through the perforations 26. This member may form a wiper and it also acts to prevent air currents from passing between the windshield and the housing, which might act to prevent the heated air from properly contacting the windshield to melt the ice and snow therefrom.

Thus as the vehicle travels along, air will pass through the perforations 19 and 24 and be heated by the coil 20 and will then pass through the two rows of perforations 26 and thus strike the windshield in two streams to melt the ice and snow therefrom.

In the modification shown in Figure 6, the device, shown generally at 29, is similar to that shown in Figures 4 and 5, with the exception that the partition plates 23 and 25 are removed.

In the device shown in Figure 6 and that shown in Figures 4 and 5, the air is forced through the perforations in the front edge of the member by the forward movement of the vehicle when the device is arranged in front of the windshield and, of course, the heating of the air in the housing also causes a circulation of the air through the housing.

As shown in Figure 4, the device is pivoted to an arm 30 which is pivoted to a suitable support so that the device can be oscillated over a transparent member and the lower end of the device has a handle 31 attached thereto for facilitating the movement of the device.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A heating device for the transparent panel of a windshield or the like, comprising an arm pivoted at one edge of the panel to lie parallel therewith, an elongated channeled housing, open at the side next to the panel and having a perforated opposite side, a pivot connecting the housing to the arm whereby the said housing may be swung independently of the swingng movement of the arm, a handhold on the housing, and an electric heating coil coextensive with and within the housing for confronting relation to the panel through the open side of said housing.

In testimony whereof I affix my signature.

EDWARD J. GALLAGHER, Jr.